(12) United States Patent
Bradshaw-Reed

(10) Patent No.: US 12,543,840 B1
(45) Date of Patent: Feb. 10, 2026

(54) HEATED PET NAIL CLIPPERS

(71) Applicant: Deborah Bradshaw-Reed, Midlothian, TX (US)

(72) Inventor: Deborah Bradshaw-Reed, Midlothian, TX (US)

( * ) Notice: Subject to any disclaimer, the term of this patent is extended or adjusted under 35 U.S.C. 154(b) by 169 days.

(21) Appl. No.: 18/368,679

(22) Filed: Sep. 15, 2023

Related U.S. Application Data

(60) Provisional application No. 63/410,249, filed on Sep. 27, 2022.

(51) Int. Cl.
*A45D 29/02* (2006.01)
*A01K 13/00* (2006.01)

(52) U.S. Cl.
CPC ............... *A45D 29/02* (2013.01); *A01K 13/00* (2013.01)

(58) Field of Classification Search
CPC ...................................................... A45D 29/02
USPC ......................................... 119/610; 30/26–29
See application file for complete search history.

(56) References Cited

U.S. PATENT DOCUMENTS

| | | | | |
|---|---|---|---|---|
| 6,735,871 B1* | 5/2004 | Todd-Russell | .......... | B26B 13/24 30/140 |
| 7,621,011 B2* | 11/2009 | Smith | .............. | A01K 17/00 30/28 |
| 2007/0137041 A1* | 6/2007 | Manheimer | ............ | A01K 13/00 30/29 |
| 2016/0066542 A1* | 3/2016 | Kearns | .................. | A01K 17/00 30/29 |

FOREIGN PATENT DOCUMENTS

| | | | | |
|---|---|---|---|---|
| CN | 113261513 A | * | 8/2021 | ........... A01K 13/004 |
| DE | 20006776 U1 | * | 11/2000 | ............... H05B 3/00 |
| EP | 0737551 A2 | * | 10/1996 | ............... H05B 3/00 |
| FR | 2812835 A1 | * | 2/2002 | ............ B26B 13/24 |
| KR | 100261780 B1 | * | 9/2000 | |
| KR | 20160045274 A | * | 4/2016 | ............ B26B 13/22 |
| WO | WO-9816355 A1 | * | 4/1998 | .............. B26D 7/10 |
| WO | WO-2020208386 A1 | * | 10/2020 | ............ A01K 13/00 |

* cited by examiner

*Primary Examiner* — Jennifer S Matthews
(74) *Attorney, Agent, or Firm* — Kenneth L. Tolar

(57) ABSTRACT

Heated nail clippers include a pair of spaced, reciprocal handles that open and close a pair of cutting blades. Each cutting blade includes an inner cutting edge configured to easily sever a pet's nails and an internal heating element or similar equivalent that heats the blades to a predetermined temperature. Accordingly, the clippers are used on an anesthetized pet to trim lengthy nails and to prevent regrowth. Furthermore, the clippers are used to significantly trim a cat's nails as an alternative to the controversial practice of declawing.

10 Claims, 1 Drawing Sheet

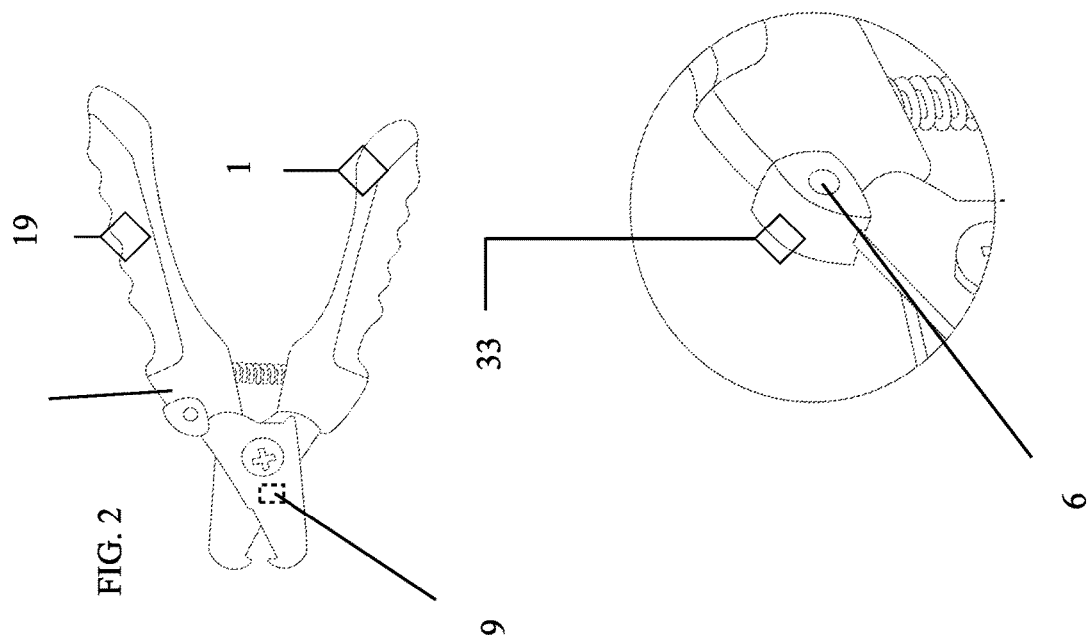
FIG. 2
FIG. 4
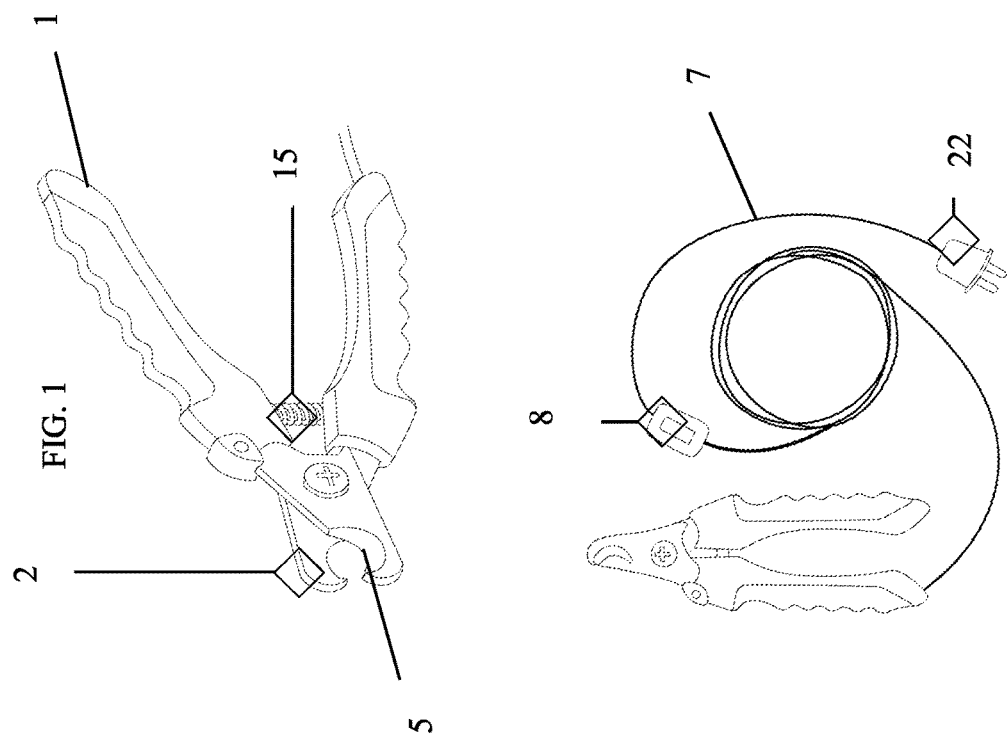
FIG. 1
FIG. 3

HEATED PET NAIL CLIPPERS

CROSS REFERENCE TO RELATED APPLICATIONS

This application claims priority of provisional application No. 63/410,249 filed on Sep. 27, 2022, the specification of which is incorporated herein by reference.

BACKGROUND OF THE INVENTION

The present invention relates to heated pet clippers that prevent nail regrowth and promote cauterization of blood vessels deep within a pet's nails.

DESCRIPTION OF THE PRIOR ART

Many pets suffer from various disorders, such as nail splitting, excessive chewing of the nails and fluid discharge beneath the nails, that require frequent nail trimming. Furthermore, longer nails result in scratching of pet owners, furniture, and flooring if not trimmed regularly. Longer nails on a cat are particularly problematic because cats frequently scratch furniture and other valuable items when sharpening their claws. As a result, many cat owners opt to declaw their cats, which many believe to be a cruel and inhumane practice.

A dog's toenail has an outer protective shell and a soft inner core, i.e., a "quick," that contains blood vessels and nerves. When a pet owner or veterinarian is trimming the nails, he or she must exercise extreme caution to avoid cutting the quick, which can cause severe pain or injury. Therefore, most pet owners prefer a veterinarian to clip their pet's nails. However, the nails quickly regrow, resulting in recurrence of the above-described problems.

Accordingly, there is currently a need for a device that eliminates the above-described problems associated with pet nail maintenance. The present invention addresses this need by providing heated nail clippers that promote cauterization of the nail quick to eliminate bleeding and to reduce or eliminate nail regrowth.

SUMMARY OF THE INVENTION

Heated nail clippers include a pair of spaced, reciprocal handles that open and close a pair of cutting blades. Each cutting blade includes an inner cutting edge configured to easily sever a pet's nails, and an internal heating element or similar equivalent that heats the blades to a predetermined temperature. Accordingly, the clippers are used on an anesthetized pet to trim lengthy nails and to prevent regrowth. Furthermore, the clippers may be used to significantly trim a cat's nails as an alternative to the controversial practice of declawing.

It is therefore an object of the present invention to provide pet nail clippers having heated cutting blades.

It is therefore another object of the present invention to provide heated nail clippers that promote cauterization of fragile nail tissue.

It is therefore yet another object of the present invention to provide heated nail clippers that eliminate the cruel practice of cat declawing.

Other objects, features, and advantages of the present invention will become readily apparent from the following detailed description of the preferred embodiment when considered with the attached drawings and the appended claims.

BRIEF DESCRIPTION OF THE DRAWINGS

FIG. 1 is a perspective view of the clippers according to the present invention.

FIG. 2 is a plan view of the clippers.

FIG. 3 is a top, plan view of the clippers.

FIG. 4 is a detailed view of the electronics housing and heating element LED.

DESCRIPTION OF THE PREFERRED EMBODIMENT

The present invention relates to heated nail clippers comprising a pair of spaced, reciprocal handles 1 that open and close a pair of cutting blades 2. Each handle 1 is encapsulated with an insulative sleeve 3 to prevent burning the user's hands. The outer surfaces of the handle preferably include finger indentations 19 to enhance the user's grip. The handles 1 are spring biased to normally orient the cutting blades in an open position.

Each cutting blade 2 includes an inner cutting 5 edge configured to easily surround and sever a pet's nails. For example, each blade may include an arcuate, concave, or hollow inner edge that more easily severs rigid pet nails. One or both blades include an internal heating element 9 or similar equivalent that heats the blade to a predetermined, safe temperature. A temperature regulator is electrically connected to the heating elements to prevent excessive blade temperatures that could injure the pet. An electronics housing 33 on one of the handles includes the heater regulator and an LED 6 that is illuminated when the heating element reaches a desired cutting temperature. A power cord 7 with a wall plug 22 extends from a distal end of one of the handles for powering the heating elements and regulator with a standard wall-mounted electrical receptacle. The cord 7 includes a power switch 8 for selectively disabling the heating elements when the clippers are not in use.

Accordingly, the clippers are used on an anesthetized pet to trim lengthy nails. The heated blades will cauterize the nail quicks to prevent or minimize regrowth. Furthermore, the clippers may be used to significantly trim a cat's nails as an alternative to the controversial practice of declawing.

The above-described device is not limited to the exact details of construction and enumeration of parts provided herein. Furthermore, the size, shape, and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. Heated nail clippers comprising:
   a pair of spaced, reciprocal handles each having a cutting blade at a distal end; each cutting blade having an inner cutting edge that is adapted to easily surround and sever a pet's nails;
   a heater within said cutting blade, whereby said heater causes said cutting blades to cauterize a pet's nail quick to prevent regrowth.

2. The heated nail clippers according to claim 1 wherein each of said handles is encapsulated with an insulative sleeve to prevent burning a user's hands.

3. The heated nail clippers according to claim 2 wherein an outer surface of each of said handles includes finger indentations to enhance a user's grip.

4. The heated nail clippers according to claim 2 wherein each of said blades includes an arcuate, concave, hollow inner edge that more easily severs rigid pet nails.

5. The heated nail clippers according to claim 1 wherein said handles are spring biased to orient the cutting blades in an open position.

6. The heated nail clippers according to claim 1 further comprising a temperature regulator electrically connected to said heating element to prevent excessive blade temperatures that could injure the pet.

7. The heated nail clippers according to claim 6 further comprising an LED on one of said handles that is illuminated when the heating element reaches a predetermined temperature.

8. The heated nail clippers according to claim 7 further comprising a power cord extending from one of the handles for powering the heating element with a wall-mounted electrical receptacle.

9. The heated nail clippers according to claim 8 wherein said cord includes a power switch for selectively disabling the heating elements when the clippers are not in use.

10. The heated nail clippers according to claim 6 wherein said heater regulator is within an electronics housing on one of the handles.

\* \* \* \* \*